Nov. 20, 1962
L. PETERS
3,064,543
CONTAINER MANIPULATING APPARATUS
Filed May 23. 1960
5 Sheets-Sheet 1
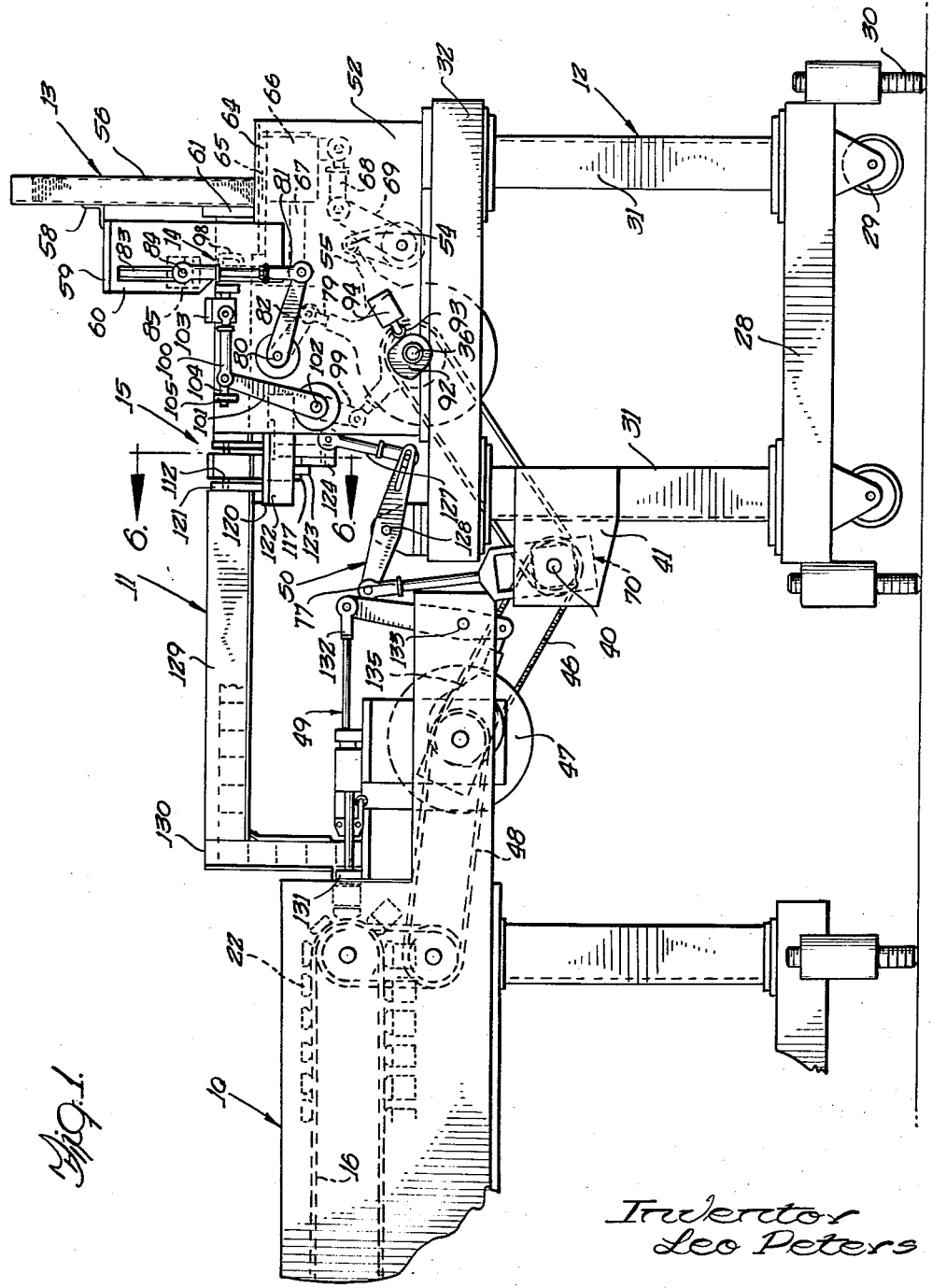
Inventor
Leo Peters
Dawson, Tilton, Fallon & Lungmus
Attorneys

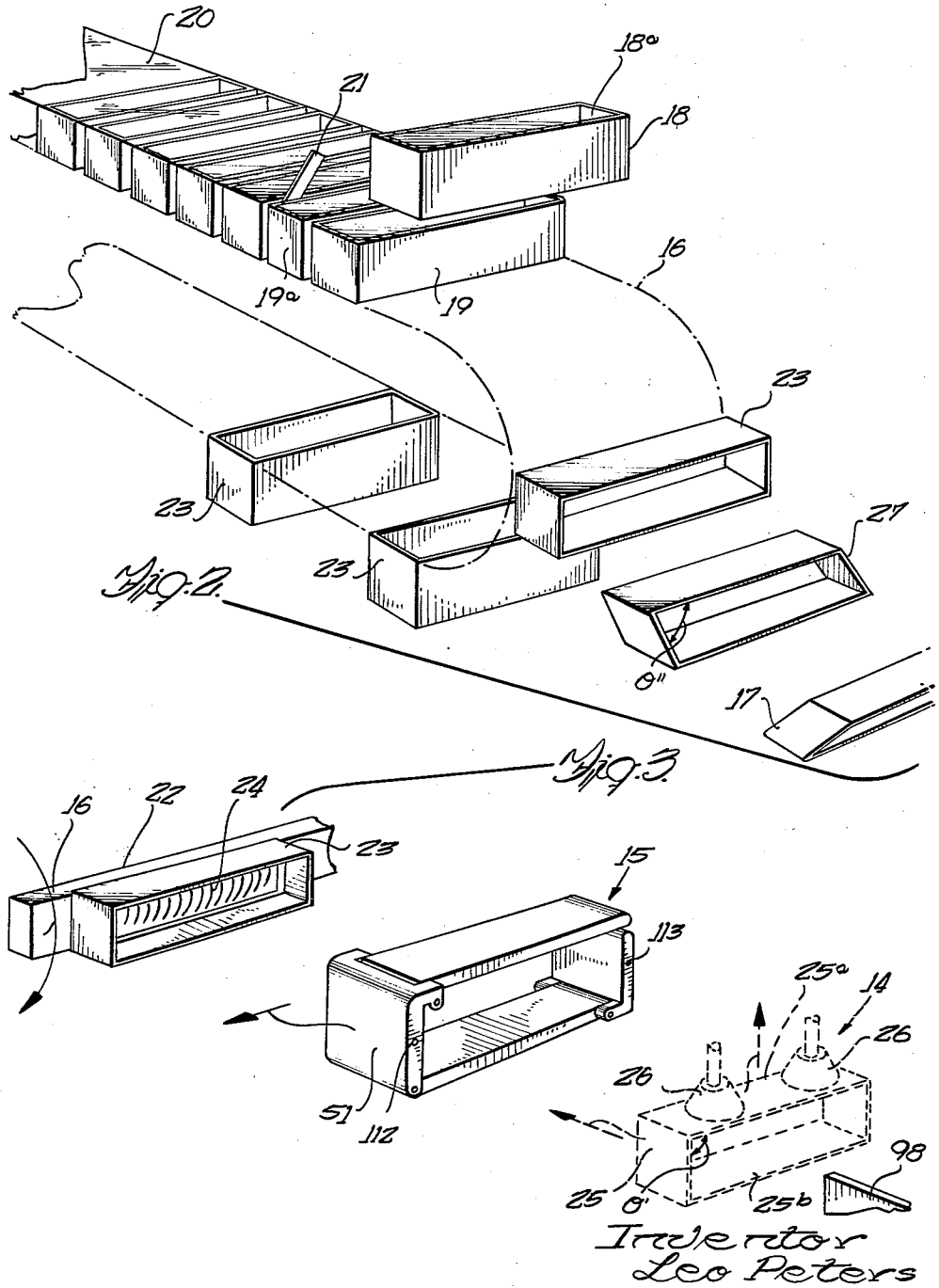

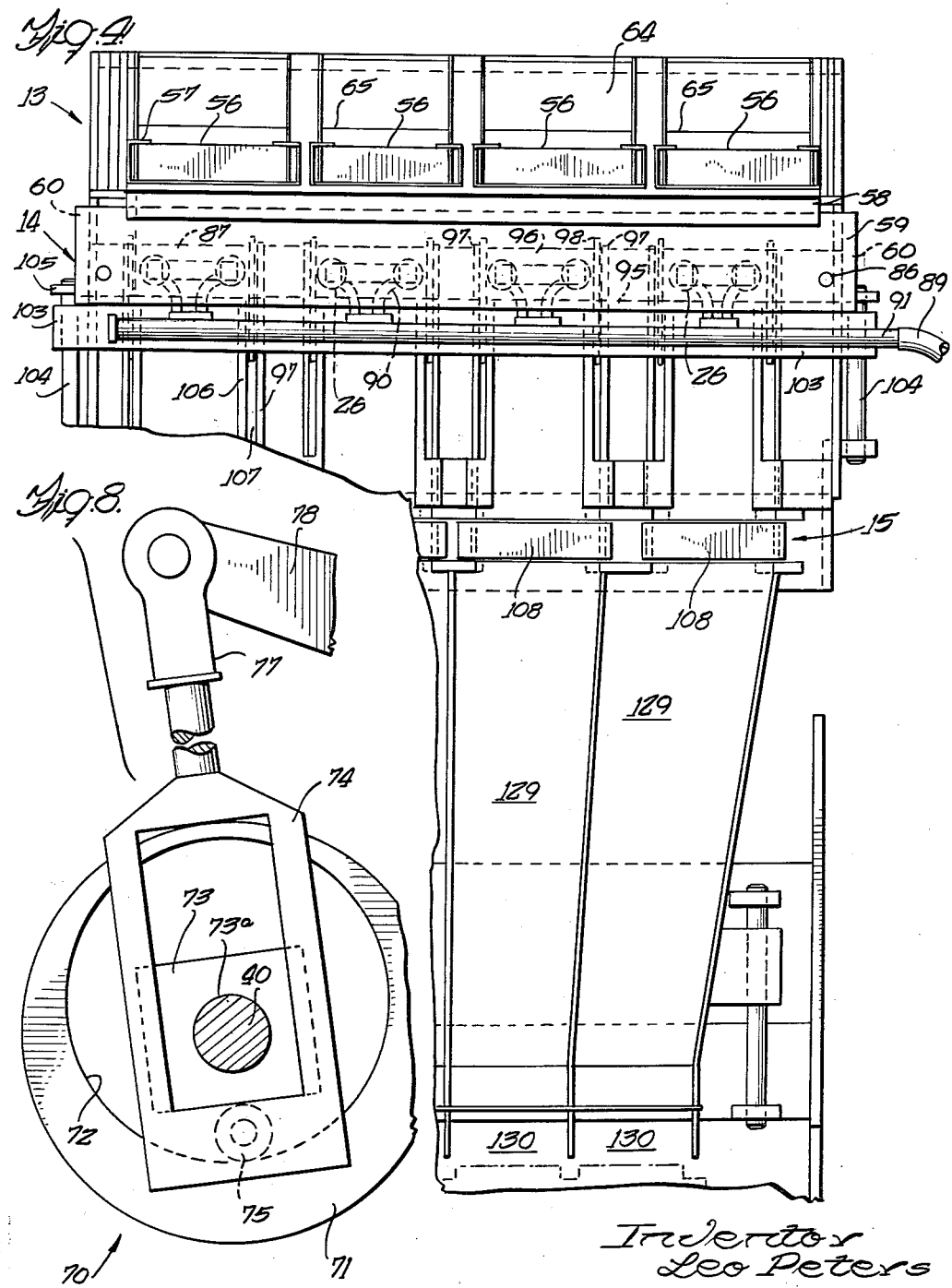

Nov. 20, 1962 L. PETERS 3,064,543
CONTAINER MANIPULATING APPARATUS
Filed May 23. 1960

Inventor
Leo Peters
Dawson, Tilton, Fallon & Lungmus
Attorneys

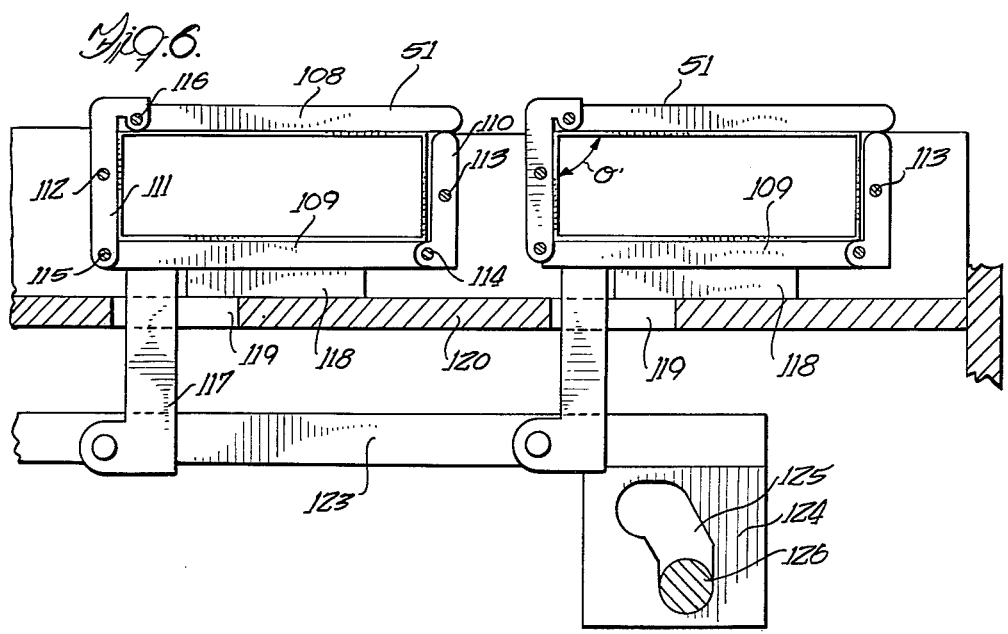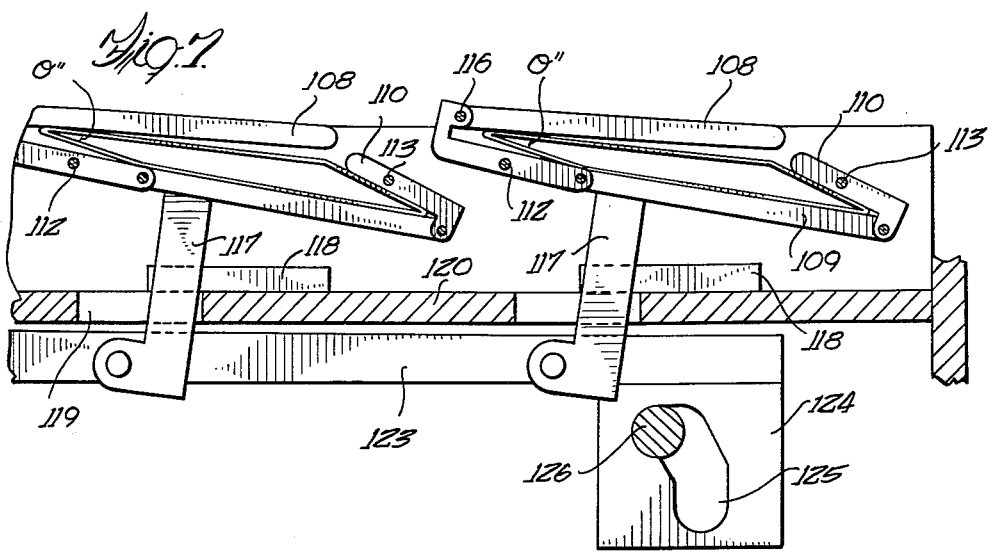

United States Patent Office 3,064,543
Patented Nov. 20, 1962

3,064,543
CONTAINER MANIPULATING APPARATUS
Leo Peters, 750 Plymouth Road SE.,
Grand Rapids 6, Mich.
Filed May 23, 1960, Ser. No. 30,981
10 Claims. (Cl. 93—53)

This invention relates to container manipulating apparatus, and, more particularly, to apparatus employed in the forming of containers equipped with a reversible pocket constructed of a thermoplastic film.

This application is related to the copending application of Leo Peters, Serial No. 667,230, filed June 21, 1957. Containers of the type produced in accordance with this invention can be seen in Peters Patent No. 2,631,939, issued March 17, 1953.

It is a general object of this invention to provide apparatus for handling one of the components of the above-referred-to container so as to provide the same in a form suitable for subsequent fabrication operation. Another object is to provide a method of handling or manipulating a container component, namely, a substantially rigid supporting collar, which overcomes the tendency of the collar to apply rupture-inducing stresses to the film employed in the pocket portion of the container.

In the fabrication of containers of the character described, a paperboard collar is advantageously employed. These collars are initially provided in collapsed form, and the first manipulating steps utilize this form advantageously. At the completion of the fabrication, any tendency of the collar to return to a substantially flat or collapsed condition is highly undesirable, because it would then tend to destroy the container. Here, it should be appreciated that the completed container derives little support or buttressing initially from the product it contains, since the product is usually in a fluid form for some time. Thus, a problem is posed in reconciling the advantages of collapsed collars at one stage of the fabrication procedure with the need for completely open collars at a subsequent stage. The solution of this problem constitutes an important objective of the invention.

Another object is to provide a method and apparatus for the handling of rigid collars which are initially provided in a folded or flattened condition whereby the collars are opened for subsequent processing and in which any tendency of the collar to return to its flat configuration is overcome.

Still another object is to provide a mechanism and method for manipulating a generally rectangular paperboard collar so as to change the configuration thereof from a flattened condition to a generally rectangular open condition and in which the collar is caused to assume a variety of parallelepipedal configurations.

Yet another object is to provide a novel apparatus for changing the configuration of a four-sided, substantially rigid, collar by manipulating the same through an angle of fold.

A further object is to provide a novel apparatus for the handling of the container components of the above-described nature which is characterized by being compact yet rugged, being further characterized by mechanical linkages and novel camming arrangements so as to facilitate adjustment and promote high speed, uninterrupted operation in a container fabrication operation.

Other objects and advantages of the invention may be seen in the details of construction and operation as set down herein.

The invention, in conjunction with an illustrative embodiment, will be explained in connection with the accompanying drawing, in which—

FIG. 1 is a fragmentary side elevational view of apparatus embodying teachings of the invention;

FIG. 2 is a fragmentary perspective view of apparatus as seen in FIG. 1 and in enlarged form, this view showing a sequence of operations on container portions;

FIG. 3 is a fragmentary perspective view of apparatus of the invention which implements and further explains the operations seen in FIG. 2;

FIG. 4 is a fragmentary top plan view of the apparatus seen in FIG. 1;

FIG. 6 is a fragmentary elevational view, partially in section, of the collar deforming portion of the apparatus of FIGS. 1, 4 and 5, and as would be seen along the sight line 6—6 of FIG. 1;

FIG. 7 is a view similar to FIG. 6 but with the elements thereof in a different operative condition; and FIG. 8 is a fragmentary elevational view, partially in section, of a cam mechanism used in conjunction with the invention and which is seen in smaller form in FIG. 1.

Figure 5:
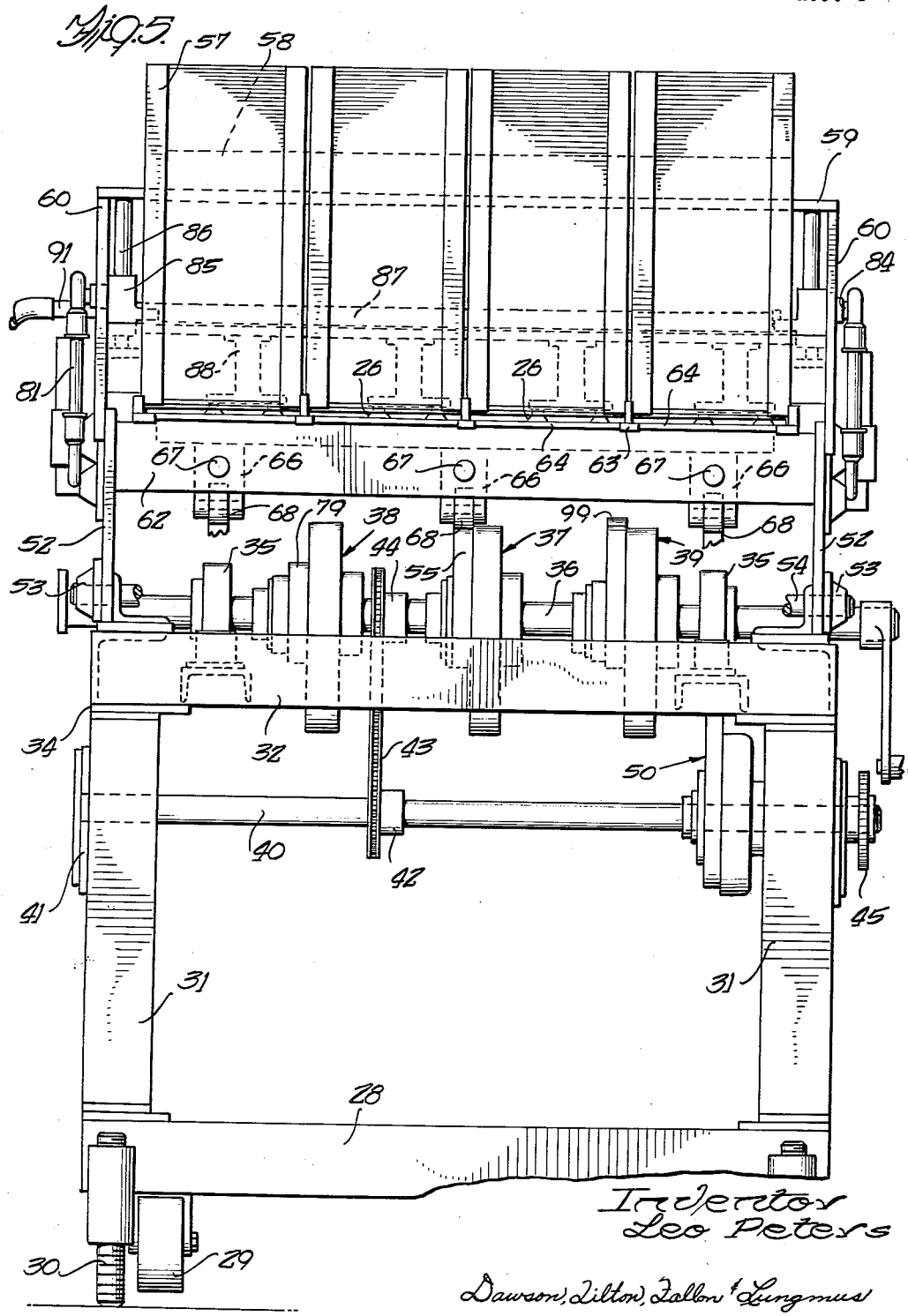
FIG. 5 is an entering end elevational view, in fragmentary form, of the apparatus seen in FIG. 1.

In the illustration given, the numeral 10 designates generally a container fabricating machine which is especially adapted to construct containers such as are seen in the above-mentioned Patent No. 2,631,939. Details of the machine 10 can be found in the above referred-to application, Serial No. 667,230, and reference is hereby made to that application for any details of construction not herein given. The above-mentioned application describes a means for supplying open rectangular collars to the machine 10 and the instant invention provides an alternative thereto.

In accordance with this, and with reference to FIG. 1, the numeral 11 designates generally a collar manipulating or forming apparatus which is adapted to provide opened collars to the machine 10. Still referring to FIG. 1, the numeral 12 designates generally a supporting frame for the apparatus 11. The frame 12 carries three major mechanisms for the handling of collars, these including a magazine generally designated 13, an opening mechanism generally designated 14 (also seen in FIG. 4), and a deforming mechanism generally designated 15. After the sequence of operations has been performed by these mechanisms, the collars are sequentially advanced to and mounted on a conveyor 16 provided as part of the machine 10. The sequence of operations performed by the apparatus 11 can be appreciated from a consideration of FIGS. 2 and 3, and this operational sequence will now be described with reference thereto.

General Operation

Referring more specifically to FIG. 2 and to the extreme lower right-hand portion thereof, the numeral 17 is applied to a container component, i.e., a collar of the above-mentioned character, as the same would be provided in the magazine 13. The collar 12 is seen to be four-sided, but in a collapsed or lay-flat condition. In other words, the angle $\theta$ is a straight angle or, more precisely, an angle that is nearly 180°.

Still referring to FIG. 2, the numeral 18 designates the collar when it is in its final form as being an integral part of the container, the container pocket in FIG. 2 being designated by the numeral 18a. Also seen in FIG. 2 are collar-equipped containers in various stages of fabrication, the container designated 19 being identical to that designated 18 except that it has not yet been ejected or removed from the conveyor 16. The container designated 19a is only partially detached from the pocket-providing web 20, the cutting or severing operation being represented schematically by means of a shear or knife 21.

The numeral 23 designates the ultimate condition of a collar after leaving the inventive machine and when it is mounted in a die 24 of a crossbar 22 of the conveyor 16. This form of collar 23 is seen in FIG. 2 as well as FIG. 3, the showing in FIG. 2 illustrating the conveyor 16 schematically. It is noted that the opened collar 23 is applied to the conveyor at one end, i.e., the turn-around for the conveyor.

Referring now to FIG. 3, the numeral 25 is applied to a collar when it is in an opened condition as would be the case when it is under the influence of the suction heads 26 of the mechanism 14—these elements to be described hereinafter in greater detail. In the configuration designated 25, the angle between adjacent sides corresponding to the angle $\theta$ in the configuration designated 17 in FIG. 2, is approximately a right angle and is designated by the symbol $\theta'$. However, because of the inherent characteristics of the collar, it tends to assume a configuration in which the angle $\theta'$ is increased as approaching a straight angle.

The numeral 27 as applied to the collar configuration in FIG. 2 shows the configuration of the collar when the deforming mechanism 15 is operated to move from its FIG. 3 configuration to that of FIG. 7, the angle between adjacent sides being designated $\theta''$ now being acute. This operation, effectively results in overcoming any tendency the collar has to return to the flat configuration designated 17. In other words, this overcomes the "fight" of the collar corner which is initially provided in a flat condition.

The general operation contemplates, therefore, providing the collar in a flat condition as at 17, opening the same to the condition designated 25 in FIG. 3, overfolding the collar to the condition designated 27 where the overall configuration is generally that of a parallelepiped and thereafter returning the collar to its rectangular condition and mounting the same on the conveyor 16.

The mechanism which may be advantageously utilized for the performance of this procedure can be seen by reference, in the first instance, to FIG. 1. The overall apparatus is also pictured in FIGS. 4 and 5 which are, respectively, top plan and entering end elevation views of the FIG. 1 apparatus. In some instances, the numerals have not been applied to all of the views in order to eliminate unnecessary detail.

Referring now to FIG. 1, the numeral 28 designates a base for the apparatus 11, the base 28 being equipped with wheels 29 and support legs 30. The support legs 30 are of an adjustable nature and support the base 28 independently of the wheels 29. Thus, stability of the apparatus 11 is insured, yet easy portability is provided.

The numeral 31 in FIGS. 1 and 5 designates columns which upstand from the base 28 for the support of a platform 32. The platform 32 is seen to be intermediate the height of the apparatus 11 and is made up of angle members 33 (see FIG. 5) and plates 34, to form an open framework for supporting bearings 35. A shaft 36 is journaled for rotation in the bearings 35 and extends transversely of the apparatus 11, i.e., in a direction normal to the direction of movement of the collars during the manipulation thereof in the mechanisms designated 13—15.

The numeral 37 (most clearly seen in FIG. 5) designates a cam system coupled to the shaft 36 and which is employed for pushing or extracting collapsed collars from the magazine 13 so as to transport the same to the opening mechanism 14.

The numeral 39 designates generally yet another cam system, analogous to the heretofore-mentioned systems 37 and 39, the system 39 being employed for pushing opened collars from the mechanism 14 to the deforming mechanism 15.

The numeral 40 designates a shaft disposed parallel to the shaft 36 and located therebelow (see FIG. 5), and adjacent the left-hand portion of the apparatus 11 in FIG. 1. The shaft 40 functions as an intermediate drive shaft and is journaled in brackets 41 (see FIGS. 1 and 5) which are rigidly attached to the frame 12. The numeral 42 (see FIG. 5) designates a sprocket which is fixed to the shaft 40 for driving the same. For this purpose, a chain 43 is entrained over the sprocket 42 and is also entrained over a sprocket 44 on the driven shaft 36. For driving the shaft 40, a sprocket 45 is provided (see the extreme right-hand portion of FIG. 5), over which a chain 46 is entrained (see FIG. 1). The chain 46, in turn, derives its movement from a Geneva drive 47 which may be conveniently provided on the machine 10. Omitted for the sake of simplicity of presentation are idler sprockets, movable mountings, etc., which may be employed so as to properly tension the chain 46. The Geneva drive 47, as seen in FIG. 1, may be employed to operate the conveyor 16 as by the chain and sprocket connection 48. Also, the Geneva drive 47 is coupled to a pusher apparatus generally designated 49 in FIG. 1, which is employed for moving the opened, deformed collars into positions on the conveyor 16.

The numeral 50 (see FIG. 1) designates generally a linkage system between the shaft 40 and the housings 51 (see FIGS. 3 and 6) provided as part of the deforming mechanism 15. Thus, it will be seen that a single power source, the Geneva drive 47, is effective to operate all of the various mechanisms. The intermittent movement of the Geneva drive 47 is effectively transmitted to the cam shaft 36 by means of the intermediate drive shaft 40. The cam shaft 36, being equipped with the cam mechanism 37, sequentially extracts single, folded collars from the magazine 13. The cam mechanism 38 provides a movement in which the suction heads 26 open the collars to the generally rectangular configuration designated 25 in FIG. 3 (the angle $\theta'$ being about a right angle). The cam system 39, like the systems 37 and 38, is also responsive to the movement of the cam shaft 36, and this mechanism serves to operate a pusher mechanism effective to transfer the now opened collars from the suction heads 26 to the housings 51 in the deforming mechanism 15.

This same intermittent, sequential operation or movement is applied to the deforming housings 51 by means of the connection or linkage system generally designated 50. As a collar is deformed within any one of the housings 51, it is thereafter advanced under the influence of the pusher mechanism responsive to the cam system 39 along a trough and ultimately into position for installation on the conveyor 16 by means of the pusher mechanism 49—this last-mentioned mechanism also being responsive to the Geneva drive 47.

*Magazine*

Hereunder, the description is principally concerned with the magazine hereinbefore generally designated 13. The support for this mechanism is provided in the form of the upstanding walls 52 (see FIGS. 1 and 5). The walls 52 upstand from the platform 32 and may be conveniently welded or bolted thereto. The walls 52 provide a support for bearing 53 (seen only in FIG. 5 and therein immediately above the platform 32). The bearings 32 provide journals for the mounting of a rocker shaft 54 provided as part of the cam system 37. The rocker shaft 54 is seen only in fragmentary form in FIG. 5, but is clearly seen in end elevation in FIG. 1. Therein, the rocker shaft 54 is seen to be disposed parallel to the cam shaft 36. The numeral 55 designates a connection between the cam shaft 36 and the rocker shaft 54 so that the rocker shaft 54 is responsive to movement of the cam shaft 36.

The numeral 56 (see FIGS. 1 and 4) designates each of the four magazines illustrated in the drawing. Each of the magazines 56 includes channel shaft walls 57 which are rigidified and tied together by means of a transverse stringer 58 (seen in each of FIGS. 1, 4 and 5). The numeral 59 designates a top plate provided as part of the frame generally designated 12 which is supported on side plates 60 (see FIG. 5), the side plates 60 being rigidly connected to and upstanding from the walls 52. The angle stringer 58 is secured to the above-mentioned top plate 59 so as to derive support from the frame 12.

The numeral 61 (seen only in FIG. 1) designates a lower stringer member (i.e., parallel to the member 58) which is supported on the upper edges of the walls 52 and which also serves to tie together and rigidify the four magazines 56. The extreme lower portion of each of the magazines 56 is closed by means of an endplate 62 (seen only in FIG. 5), which is secured to the walls 52. Immediately forward of the plate 62 is positioned mechanism for sequentially extracting single collars, and thus the plate 62 effectively prevents any accidental interference with the collar-removing mechanism. The numeral 63 (seen only in FIG. 5) designates brackets or clips which secure the lower ends of the magazines 56 together.

The numeral 64 (seen in all of FIGS. 1, 4 and 5) designates a pusher which is employed for sequentially extracting a single, folded collar from the magazines 56. A single pusher 64 is employed, with the upper surface thereof being provided with a step 65 (see FIG. 1). Thus, only a single collar from the stacked group of collars is extracted from the magazines 56. The pusher 64, as can be best seen in FIGS. 1 and 5, is equipped with depending blocks 66 which are slidably mounted on rods 67. The rods 67, as seen in FIG. 1, are supported in immobile fashion on the frame generally designated 12, i.e., between cross members secured between the plates or walls 52.

Each of the pusher-supporting blocks 66 is equipped with a linkage member pivotally connected thereto, the linkage member being designated 68 (see FIGS. 1 and 5). The first linkage member 68 in turn is pivotally connected to a second linkage member 69, which is fixed to the rocker shaft 54.

The rocker shaft 54, as mentioned hereinbefore, is responsive to the cam shaft 36 by virtue of the cam system 37 and the linkage 55 (see FIG. 1). The reciprocating motion of the cam system 37 is translated through the linkage 55 to the rocker shaft 54, causing the same to oscillate. The oscillating motion is transmitted through the first and second linkage members 68 and 69 to the pusher-supporting blocks 66. As these blocks reciprocate, so also does the pusher 64 to selectively extract single, folded collars from the magazines 56.

The operation of the cam mechanisms 37—39 can be better appreciated from a consideration of FIG. 8, wherein the numeral 70 designates generally a similar cam system or mechanism. The cam system 70 is employed for operating the deforming mechanism 15, more specifically, the housing 51. As such, the mechanism 70 includes a ring-like member 71 rigidly mounted on the intermediate drive shaft 40. The ring-like cam member 71 is equipped with an inner cam surface 72. The shaft 40 has mounted thereon a bearing block 73 which does not rotate as the shaft 40 rotates. In other words, the bearing block 73 is equipped with a journal-providing surface 73a in contact with the shaft 40. Slidingly mounted on the block 73 is a yoke or sliding block 74 and which carries a cam follower roller 75 rotatably mounted thereon. The cam follower roller is urged into engagement with the inner cam surface 72 by means of a leaf spring 76 interposed between the yoke 74 and the bearing block 73. The numeral 77 designates a linkage element integral with the yoke 74 and extending, in the illustration given, upwardly therefrom. A second linkage element 78 is pivotally connected to the linkage 77, and this second linkage element 78, through various other connecting means to be described hereinafter, is coupled to the housings 51 so as to provide a reciprocatory action. I have found that the cam structure just described provides an advantageous operation in the inventive apparatus in providing a compact structure, yet one that is capable of ready adjustment so as to achieve proper timing. Any misoperation of the apparatus can be readily ascertained because of the mechanical nature of the prime mover, signalling means, and connections, so that essentially a foolproof operation is achieved.

It will be appreciated that the connecting system shown in FIG. 8 and which includes the linkage elements 77 and 78 is substantially duplicated relative to the cam system 37 which includes the connection 55 extending between the rocker shaft 54 and the shaft 36.

Referring to FIG. 1 in particular, the numeral 79 designates another two-member linkage system which interconnects the cam system 38 with the rocker shaft 80 for the purpose of actuating the opening mechanism 14. Thus, the linkage 79 corresponds to the linkage 55 which is comparable to the linkage system made up of elements 77 and 78 in FIG. 8.

Still referring to FIG. 1, the coupling between the rocker shaft 80 and the collar-contacting portion of the opening mechanism 14 includes a first linkage element 81 and a second linkage element 82 which correspond to the linkage elements 68 and 69 provided as part of the magazine unloading portion of the apparatus.

As can be appreciated from FIG. 5, the linkage element 81 (designated adjacent the upper left-hand portion of this view) is equipped with a transversely-extending rod 84 pivotally connected therewith which extends through slots 83 (see FIG. 1) in the plate 60. The rod 84 carries a block 85 (see FIG. 1) which is guided in its reciprocating motion by means of a pair of guide rods 86, the block 85 being suitably apertured for this purpose. The numeral 87 (see FIGS. 4 and 5) designates a beam extending between the blocks 85 and which, therefore, reciprocates therewith as the blocks slide on the rods 86. For this purpose, the rods 86 are rigidly integrated with the frame 12, more specifically being connected at their upper ends to the top plate 59.

Designated only in FIG. 5 are hollow depending brackets 88 which are rigidly connected to the beam 87 and which carry the suction heads 26. Suction for the suction heads 26 is provided by means of a vacuum pump, or the like (not shown), which is coupled to the brackets 88 through flexible hoses 89 and 90 (see FIG. 4) and a manifold 91. The suction is regulated by means of a timing cam 92 (seen only in FIG. 1) and which is mounted on the shaft 36 exteriorly of the side wall 52. Still referring to FIG. 1, the numeral 93 designates a cam follower roller mounted for continuous engagement with the periphery of the cam 92 and which is effective to operate a switch 94, the switch 94 in turn being operative to apply and release suction in the mechanism 14— as by a solenoid valve (not shown) in the suction line.

*Operation of Opening Mechanism*

After the pusher 64 has advanced a single, folded collar from the magazine 13 to a position underneath the suction heads 26, the camming system 38 is operative to reciprocate the beam 87 to bring the suction heads 26 into contact with the top surface of the collar. Simultaneously therewith, the timing cam 92 applies suction to the suction heads 26 so that the collar positioned under any given pair of suction heads 26 is firmly gripped thereby. In this connection, it will be noted that the suction heads 26 are spaced asymmetrically relative to the magazine 56 (see FIG. 5), but are in a position so as to symmetrically grip that surface of a collar which ultimately will be a top side when the collar is opened to the condition designated 25 in FIG. 3.

Still considering the operation of the opening apparatus 15, the collar advanced by the pusher 64 is positioned under the beam 87 through the cooperation of an abutment 95 (see FIG. 1) which is provided as part of the frame 12 and which extends between the walls 97 of a channel-shaped guide 96 (see FIG. 4). The guides or walls 97 are spaced apart a distance corresponding to the length of the opened collar, i.e., the configuration thereof as seen in FIG. 3 and designated 25. Thus, the walls 97 are symmetrical relative to the suction heads 26 and offset from the center line of the magazines 56, as can be readily appreciated from a consideration of FIG. 4. The pusher 64 thus advances the unopened collar under the walls 97 and, as the suction heads 26 raise the top wall of the collar (the surface designated 25a in FIG. 3) to open the collar, the collar fits between the walls 97. At the conclusion of the opening of the collar, i.e., to the configuration seen in FIG. 3 and designated 25, the suction is released from the heads 26 and the collar is maintained in a substantially rectangular configuration by virtue of the cooperating guides or side walls 97. At this point, the collar is advanced under the influence of puller hooks 98 which are finger-like members mounted for horizontal reciprocation in the frame 12, as can be appreciated from a consideration of FIGS. 1 and 4. The mechanism operative to bring this operation out will now be described under the heading "Second Advancing Mechanism," immediately below.

Second Advancing Mechanism

The apparatus for reciprocating the finger-like elements 98 includes a linkage 99 (see FIG. 1) analogous to the linkages 55 and 79, the linkage 99 being connected to the cam mechanism 39 in a fashion similar to the connection of the linkages 55 and 79 with the camming mechanisms 37 and 38, respectively. As mentioned hereinbefore, these linkages, which are provided as an extension of the camming mechanisms 37—39, have their counterparts in the linkage elements 77 and 78 seen in FIG. 8 and relative to the camming mechanism 70.

Extending between the linkage 99 and the fingers 98 are first and second linkage elements 100 and 101 (seen only in FIG. 1). The second linkage element 101 is fixed to the rocker shaft 102 which is journaled in the frame 12, more specifically, in the side walls 52. Thus, the riciprocatory movement produced by the camming mechanism 39 is translated to the rocker shaft 102, and this, in turn, through the elements 101 and 100, to a block 103. The block 103, as can be appreciated from FIGS. 1 and 4, is slidably mounted on guide rods 104, the block also carrying manifold 91. The guides 104 are rigidly supported as part of the frame 12 by means of clips 105 (designated only in FIG. 4) which are in turn supported on the side walls 60 of the frame. As can be appreciated from FIG. 4, the finger-like puller elements 98 are secured to the beam-like block 103. Still referring to FIG. 4, it will be noted that the guides 96, which are essentially trough-like affairs, are equipped with flanges 106 at their tops, the flanges 106 being slotted as at 107 to permit the movement of the fingers 98 when the beam-like block 103 is horizontally reciprocated.

The reciprocatory stroke of the block 103 is established as the width of a collar, and thus the guides 96 serve as a reservoir for opened collars between the opening mechanism 14 and the deforming mechanism 15. The deforming mechanism 15 will now be described.

Deforming Mechanism

Referring now particularly to FIG. 6, the retails of construction of the housings 51 are seen in enlarged form. Each housing 51 includes four side members 108—111, inclusive, with the elements 108 and 109 being the longer sides. The shorter sides 110 and 111 are pivotally mounted on pins or rods 112 and 113, these pins 112 and 113 being rigidly connected to the frame 12. The numerals 114—116 designate pivot pins interconnecting three of the sides, and can be considered movable pivots. This can be quickly appreciated from a comparison of FIGS. 6 and 7, wherein the housings 51 are shown in different operative conditions.

The numeral 117 designates an actuator arm which is connected to the lower housing element 109. Movement of the actuator arm 117 from the position of FIG. 6 to that of FIG. 7 results in transforming the rectangular arrangement of the housing in FIG. 6 to the parallelogram shape in FIG. 7. In the condition of the housing 51 seen in FIG. 6, the lower long element 109 is seen at rest upon a stop pad 118 provided as part of the plate 120. The plate 120 is also designated in FIG. 1. Still referring to FIG. 1, the plate 120 is seen to be equipped with upstanding posts 121 which carry the fixed pivots 112 and 113, only the pivots 112 being seen in the side elevation set forth in FIG. 1.

The numeral 119 designates a slot in the plate 120 through which the actuator arm for a given housing 51 extends. In the illustration given, four such slots 119 are provided. The numeral 123 designates a rocker arm to which each of the actuator arms 117 is pivotally connected, as is clearly seen in FIGS. 6 and 7. The numeral 124 designates a bracket secured to the rocker arm 123, the bracket 124 being equipped with an L-shaped slot 125. The numeral 126 designates a pin received in the slot 125, and it will be appreciated that movement of the pin 126 is productive of the change in configuration of the housings 51. For the purpose of moving the pins 126, a linkage 127 (see FIG. 1) is provided. The linkage 127 is connected at one end with the pin 126 and at the other end with the rocker shaft 128, the rocker shaft 128 being rotatably mounted upon the platform 32.

Operation of Deforming Mechanism

As indicated previously, the reciprocatory movement of the pusher fingers 98 advances collars from positions under the suction heads 26 and into the guide 96. The advancement of a subsequent collar when the guide 96 is filled causes the leading collar to be positioned within the housing 51. As this occurs, the shaft 40 is in the position to actuate the cam system 70, and through the linkage elements 77, 78 and 127, causes the rocker arm 123 to shift from the FIG. 6 position to that of FIG. 7. In so doing, the right angle $\theta'$ is converted to the acute angle $\theta''$ seen in FIG. 7, and the "fight" in the collar edge is relieved so that upon subsequent return to rectangular configuration, the collar has little or no tendency to return to the reverse condition characterized by the numeral 17 in FIG. 2. A subsequent reciprocation of the fingers 98 ejects the collars, now having been stress relieved, from the housings 51 into a horizontally-extending trough 129 (see FIG. 1). The collars are intermittently advanced along the trough 129 until the vertical chute 130 is reached, whereup the collars descend in intermittent fashion for engagement with the pusher head 131 of the pusher apparatus 49.

The pusher head 131 (see FIG. 1) is effective to advance four collars simultaneously in the illustration given for mounting within the openings 24 of the crossbars 22 of the conveyor 16, as is seen in perspective form in FIG. 3. The pusher head 131 is actuated through the linkage 132, which is connected on the rocker shaft 133 and which is responsive to a camming system 135 coupled to the Geneva drive 47. Advantageously, the heads 131 may be forwardly tapered to overcome any tendency of the collars to bow inwardly and thus resist mounting on the die 24.

Operation

Summarizing the operational sequences herein before set forth, the cartons are provided in a collapsed condition such as that designated by the numeral 17 in FIG. 2. These are provided in stacks from the fabricator and may be manually or automatically loaded in the magazines 56. In contemplation of the subsequent container fabrication (i.e., the equipping of the collars with the plastic film pockets), one perimetric edge of the collar is conveniently equipped with an adhesive such as a polyvinyl adhesive where the film 20 is a polyvinyl chloride film. Inasmuch as the collars are usually constructed of paperboard, the collars vary somewhat in size and thickness. This poses a problem in the handling thereof which is advantageously overcome in the inventive apparatus.

Irrespective of the deviation from specification of the collars, the horizontally-reciprocable pusher 64 engages a collar for advancement to a position out from under the stack of collars in the magazines 56. Each subsequent advancement promotes advancement of a preceding collar, and ultimately a collar is positioned underneath the opening mechanism 14. It will be appreciated that the number of collars arranged in side-by-side relation will depend upon the spacing of the magazine and the beam 87 supporting the suction heads 26. The camming system 38 which is responsible for the actuation or reciprocation of the beam 87 is constructed so as to cause the downward movement of the beam immediately after completion of the forward stroke of the pusher 64. At the completion of the downward stroke of the beam 87, the timing cam 92 provides for a vacuum in the suction heads 26.

The imposition of the vacuum to the suction head 26 causes these heads to tightly grip the upper side 25a (see FIG. 3) of a collar and in cooperation with the guide walls 97 converts the previously folded collar into the rectangular configuration designated 25 in FIG. 3. During the upward stroke of the beam 87 which brings this opening about, the suction is applied to the suction heads 26 and only after the top of the stroke of the beam 87 is reached, is the suction released through the operation of the timing cam 92. The collars in this condition are supported in generally rectangular open configuration by virtue of the guide side walls 97. Also, the bottom walls of the collars (25b in FIG. 3) are supported above their previous position so as to clear the step or abutment 95 (see FIG. 1). In this condition, the collars are advanced when the camming system 39 actuates the pusher fingers 98. This advances the opened cartons along the guide 96 and ultimately into the housings 51. As each collar enters a housing 51, the camming system 70 causes the housing 51 to change from the FIG. 6 to the FIG. 7 condition. In this connection, it will be noted that the side elements 110 and 108 are not pivotally interconnected, so that where an oversized collar is positioned within the housing 51, the upper member 108 can assume the dotted line configuration designated 108a in FIG. 7 and thus not apply a crushing or rupturing stress to the collar.

The collars, after the "overfolding" achieved by the housings 51, are then advanced through the trough 129, still under the influence of the pusher fingers 98, moved downwardly by gravity in the chute 130, after which they are again advanced horizontally and into position on the conveyor of the container-forming machine 10. If desired, the pusher mechanism 49 may be equipped with a pivotal forward portion to compensate for any nonrectangularity of the collars. Where a collar is oversized and confined between side walls, there is a tendency of the collar to bow outwardly, and this can be compensated for just prior to inserting of a collar onto the die 24 of an associated crossbar 22.

In the foregoing operations, the time sequence is achieved through the use of a novel cam arrangement which makes possible compact, yet dependable, machine operation. The entire handling of the collars also is integrated and correlated with the operation of the forming machine 10.

While, in the foregoing specification, I have set forth a detailed description of an embodiment of the invention for the purpose of illustration thereof, many variations in the details herein given will be appreciated by those skilled in the art without departing from the spirit and scope of the claims.

I claim:

1. In apparatus for manipulating folded rectangular collars, a frame, means on said frame for folding said collars to a first parallelepipedal configuration, and a generally rectangular subframe mounted on said frame spaced from said means adapted to have collars sequentially inserted therein, said subframe having top, bottom and end walls, with said end and bottom walls pivotally interconnected, said top wall being pivotally interconnected with only one of said end walls and at only one end of said top wall, the remainder of said top wall being free of any connection, whereby said top wall is adapted to move independently of all of the other walls of said subframe, and means on said frame on the side of said subframe opposite the movable top wall, for rocking said subframe.

2. In apparatus for manipulating container components, a frame, magazine means on said frame adapted to stack collapsed, rectangular collars, first reciprocating means for sequentially moving the lowermost collar of a stack of collars and avancing the same, second reciprocating means on said frame for gripping an advanced collar and converting the same to an unfolded condition, third reciprocating means on said frame for advancing a collar from said second reciprocating means, a four-sided housing on said frame adapted to receive collars advanced by said third reciprocating means, three of said sides being pivotally interconnected, the fourth of said sides being pivotally interconnected with only one adjacent side and at only one end of said fourth side, the remainder of said fourth side being free of any connection, whereby said fourth side is adapted to move independently of all of the other sides, and means on said frame on the side of said housing opposite said fourth side for moving said sides relative to each other to change the housing configuration from rectangular to a nonrectangular configuration.

3. In apparatus of the character described, a frame, a generally rectangular open housing rockably mounted on said frame, means for introducing a collar to be overfolded into said housing, said housing comprising four side members normally arranged in quadrilateral relation, means pivotally interconnecting three of said side members, pivot means interconnecting only one end of the fourth side member with an adjacent side member with the other end of the said fourth side member being free to move out of said quadrilateral relation to accommodate collars of differing dimensions, and means on said frame on the side of said housing opposite said fourth side for rocking said housing to vary the angle between two of said three side members from a right angle to an obtuse angle.

4. The structure of claim 3 in which said four side members include a pair of shorter members and a pair of longer members, said fourth side member being one of said longer members.

5. The structure of claim 4 in which each of said pair of shorter members is pivotally mounted on said frame, one of said members being equipped with a recess adjacent the pivotal interconnection of said one member with an adjacent member.

6. In apparatus for manipulating components of a container, a frame, magazine means on said frame adapted to stack collapsed, rectangular collars, first reciprocating means on said frame for sequentially removing the lowermost of a stack of collars and advancing the same, second reciprocating means on said frame for gripping an advanced collar and converting the same to an unfolded condition, third reciprocating means on said frame for advancing a collar from said second reciprocating means, fourth reciprocating means on said frame for overfolding a collar after the same has been advanced by said third reciprocating means to overcome the tendency of the collar to return to its initially folded condition, said fourth means including a generally rectangular open housing with three pivotally interconnected sides, the fourth side being pivotally interconnected with only one of said three sides and free at its other end to move independently of said three sides, whereby crushing stresses are avoided in said housing means on said frame on the side of said housing opposite said fourth side for rocking said housing, and means for powering each of said reciprocating means to provide a time sequential operation, said powering means including cam means for each of said reciprocating means.

7. In apparatus of the character described, a frame, magazine means on said frame adapted to stack collapsed, rectangular collars, first reciprocating means for sequentially removing the lower of a stack of collars and advancing the same, second reciprocating means on said frame for gripping an advanced collar and converting the same to an unfolded condition, third reciprocating means on said frame for advancing a collar from said second reciprocating means, fourth reciprocating means on said frame for overfolding a collar after said collar has been advanced by said third reciprocating means whereby the tendency of the collar to return to its initially folded condition is effectively overcome, said fourth reciprocating means including a generally rectangular open housing having four sides arranged in quadrilateral relation, three of said sides being pivotally interconnected, with the fourth side being pivotally connected at only end thereof to provide a free end in said fourth side supported on its associated side member, means on said frame on the side of said housing opposite said fourth side for rocking said housing, intermittent drive means for each of said reciprocating means, cam means interconnected with each of said reciprocating means and including a cam follower-equipped block, and shaft means on said frame having said cam means fixed thereto for rotation therewith, said block being mounted on said shaft means for reciprocal movement transverse thereto.

8. In apparatus of the character described, a frame, magazine means on said frame adapted to stack collapsed, rectangular collars, first reciprocating means for sequentially removing the lowermost collar of a stack of collars and advancing the same, second reciprocating means on said frame for gripping an advanced collar and converting the same to an unfolded condition, third reciprocating means on said frame for advancing a collar from said second reciprocating means, a rectangular open housing in the path of collars being advanced by said third reciprocating means, said housing having three pivotally interconnected sides, the fourth side having one free end and one end pivotally interconnected with said three sides, said one free end normally being supported on one of said three sides but movable out of supporting relation therewith to accommodate an oversized collar and means on said frame on the side of said housing opposite said fourth side for moving said sides to cause said housing to assume a generally parallelepipedal configuration.

9. In apparatus for overfolding rectangular paperboard containers, and the like, a frame, a generally rectangular open housing rockably mounted on said frame and sized to receive one of said containers, said housing providing four interconnected side members arranged to form an open-ended housing, means pivotally interconnecting the adjacent ends of three of said side members, pivot means interconnecting only one end of the fourth side member with an adjacent side member and with the other end of the fourth side member being free to move away from its adjacent side members, one of said members being equipped with a recess adjacent its pivot means, and means on said frame on the side of said housing opposite said fourth side for rocking said housing to cause the same to assume a generally parallelepipedal configuration.

10. In apparatus for manipulating folded rectangular collars, a frame, means on said frame for folding said collars to a first parallelepipedal configuration, a generally rectangular subframe mounted on said frame spaced from said means and adapted to have collars sequentially inserted therein, said subframe having top, bottom and end walls with said end, top and bottom walls pivotally interconnected to provide a top wall free at one end thereof, one of said walls being equipped with a collar-receiving recess adjacent its point of pivotal interconnection with an adjacent wall, and means on said frame coupled to said bottom wall for rocking said subframe.

References Cited in the file of this patent

UNITED STATES PATENTS

| 1,954,908 | Zimniak | Apr. 17, 1934 |
| 1,989,286 | Milmoe | Jan. 29, 1935 |
| 2,541,607 | Piazze | Feb. 13, 1951 |
| 2,699,712 | Meyer-Jagenberg et al. | Jan. 18, 1955 |